US009289780B2

(12) United States Patent
Goodson

(10) Patent No.: US 9,289,780 B2
(45) Date of Patent: Mar. 22, 2016

(54) ELECTRICALLY-DRIVEN PARTICULATE AGGLOMERATION IN A COMBUSTION SYSTEM

(71) Applicant: ClearSign Combustion Corporation, Seattle, WA (US)

(72) Inventor: David B Goodson, Bellevue, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 279 days.

(21) Appl. No.: 13/849,770

(22) Filed: Mar. 25, 2013

(65) Prior Publication Data
US 2013/0255482 A1  Oct. 3, 2013

Related U.S. Application Data

(60) Provisional application No. 61/616,223, filed on Mar. 27, 2012, provisional application No. 61/694,212, filed on Aug. 28, 2012.

(51) Int. Cl.
*B03C 3/68* (2006.01)
*B01D 46/00* (2006.01)
*B03C 3/017* (2006.01)
(Continued)

(52) U.S. Cl.
CPC .............. *B03C 3/68* (2013.01); *B01D 46/0032* (2013.01); *B03C 3/0175* (2013.01); *B03C 2201/30* (2013.01); *F01N 3/01* (2013.01); *F01N 3/0256* (2013.01)

(58) Field of Classification Search
CPC ........... B01D 46/0032; B03C 2201/30; B03C 3/0175; B03C 3/68; F01N 3/01; F01N 3/0256
See application file for complete search history.

(56) References Cited

U.S. PATENT DOCUMENTS 1,153,182 A  9/1915  Schniewind
2,604,936 A  7/1952  Kaehni et al.
(Continued)

FOREIGN PATENT DOCUMENTS

WO    WO 96/01394    1/1996
WO    WO 2014/005143   1/2014
(Continued)

OTHER PUBLICATIONS

James Lawton et al., Electrical Aspects of Combustion, 1969, p. 61, Clarendon Press, Oxford, England.
(Continued)

*Primary Examiner* — Christopher P Jones
(74) *Attorney, Agent, or Firm* — Christopher A. Wiklof; Nicholas S. Bromer; Launchpad IP, Inc.

(57) ABSTRACT

Technologies are presented for applying electrical energy to a combustion reaction to produce agglomerated combustion particulates. For example, a system may include: one or more electrodes configured to apply electrical energy to a combustion reaction; a combustion zone configured to support the combustion reaction of a fuel at a fuel source; and an electrical power source operatively coupled to the one or more electrodes and configured to apply electrical energy to the combustion reaction. The combustion reaction is controlled to produce a distribution of agglomerated combustion particulates characterized by an increase in at least one of an average particulate diameter or an average particulate mass.

46 Claims, 6 Drawing Sheets

(51) Int. Cl.
*F01N 3/01* (2006.01)
*F01N 3/025* (2006.01)

(56) References Cited

U.S. PATENT DOCUMENTS

| | | | |
|---|---|---|---|
| 3,087,472 A | 4/1963 | Asakawa | |
| 3,224,485 A | 12/1965 | Blomgren et al. | |
| 3,306,338 A | 2/1967 | Wright et al. | |
| 3,358,731 A | 12/1967 | Donnelly | |
| 3,416,870 A | 12/1968 | Wright | |
| 3,503,348 A | 3/1970 | Dvirka | |
| 3,749,545 A | 7/1973 | Velkoff | |
| 3,841,824 A | 10/1974 | Bethel | |
| 3,869,362 A | 3/1975 | Machi et al. | |
| 4,052,139 A | 10/1977 | Paillaud et al. | |
| 4,091,779 A | 5/1978 | Saufferer et al. | |
| 4,093,430 A | 6/1978 | Schwab et al. | |
| 4,576,029 A | 6/1978 | Norman et al. | |
| 4,110,086 A | 8/1978 | Schwab et al. | |
| 4,111,636 A | 9/1978 | Goldberg | |
| 4,118,202 A | 10/1978 | Scholes | |
| 4,219,001 A | 8/1980 | Kumagai et al. | |
| 4,260,394 A | 4/1981 | Rich | |
| 4,304,096 A | 12/1981 | Liu et al. | |
| 4,340,024 A | 7/1982 | Suzuki et al. | |
| 4,439,980 A | 4/1984 | Biblarz et al. | |
| 4,649,260 A | 3/1987 | Melis et al. | |
| 4,675,029 A | 6/1987 | Norman et al. | |
| 4,903,616 A | 2/1990 | Mavroudis | |
| 4,987,839 A | 1/1991 | Krigmont et al. | |
| 5,702,244 A | 12/1997 | Goodson et al. | |
| 6,640,549 B1 | 11/2003 | Wilson et al. | |
| 6,736,133 B2 | 5/2004 | Bachinski et al. | |
| 6,742,340 B2 | 6/2004 | Nearhoof, Sr. et al. | |
| 6,887,069 B1 | 5/2005 | Thornton et al. | |
| 6,918,755 B1 | 7/2005 | Johnson et al. | |
| 7,137,808 B2 | 11/2006 | Branston et al. | |
| 7,168,427 B2 | 1/2007 | Bachinski et al. | |
| 7,182,805 B2 | 2/2007 | Reaves | |
| 7,226,496 B2 | 6/2007 | Ehlers | |
| 7,226,497 B2 | 6/2007 | Ashworth | |
| 7,243,496 B2 | 7/2007 | Pavlik et al. | |
| 7,377,114 B1 | 5/2008 | Pearce | |
| 7,523,603 B2 | 4/2009 | Hagen et al. | |
| 7,845,937 B2 | 12/2010 | Hammer et al. | |
| 7,927,095 B1 | 4/2011 | Chorpening et al. | |
| 8,082,725 B2 | 12/2011 | Younsi et al. | |
| 8,245,951 B2 | 8/2012 | Fink et al. | |
| 8,851,882 B2 | 10/2014 | Hartwick et al. | |
| 8,911,699 B2 | 12/2014 | Colannino et al. | |
| 2005/0208442 A1 | 9/2005 | Heiligers et al. | |
| 2007/0020567 A1 | 1/2007 | Branston et al. | |
| 2010/0183424 A1 | 7/2010 | Roy | |
| 2011/0072786 A1 | 3/2011 | Tokuda et al. | |
| 2011/0203771 A1 | 8/2011 | Goodson et al. | |
| 2012/0317985 A1 | 12/2012 | Hartwick et al. | |
| 2013/0004902 A1 | 1/2013 | Goodson et al. | |
| 2013/0071794 A1 | 3/2013 | Colannino et al. | |
| 2013/0170090 A1 | 7/2013 | Colannino et al. | |
| 2013/0230810 A1 | 9/2013 | Goodson et al. | |
| 2013/0230811 A1 | 9/2013 | Goodson et al. | |
| 2013/0255482 A1 | 10/2013 | Goodson | |
| 2013/0255548 A1 | 10/2013 | Goodson et al. | |
| 2013/0255549 A1 | 10/2013 | Sonnichsen et al. | |
| 2013/0260321 A1 | 10/2013 | Colannino et al. | |
| 2013/0323655 A1 | 12/2013 | Krichtafovitch et al. | |
| 2013/0323661 A1 | 12/2013 | Goodson et al. | |
| 2013/0333279 A1 | 12/2013 | Osier et al. | |
| 2013/0336352 A1 | 12/2013 | Colannino et al. | |
| 2014/0038113 A1 | 2/2014 | Breidenthal et al. | |
| 2014/0051030 A1 | 2/2014 | Colannino et al. | |
| 2014/0065558 A1 | 3/2014 | Colannino et al. | |
| 2014/0076212 A1 | 3/2014 | Goodson et al. | |
| 2014/0080070 A1 | 3/2014 | Krichtafovitch et al. | |
| 2014/0162195 A1 | 6/2014 | Lee et al. | |
| 2014/0162196 A1 | 6/2014 | Krichtafovitch et al. | |
| 2014/0162197 A1 | 6/2014 | Krichtafovitch et al. | |
| 2014/0162198 A1 | 6/2014 | Krichtafovitch et al. | |
| 2014/0170569 A1 | 6/2014 | Anderson et al. | |
| 2014/0170571 A1 | 6/2014 | Krichtafovitch et al. | |
| 2014/0170576 A1 | 6/2014 | Colannino et al. | |
| 2014/0170577 A1 | 6/2014 | Colannino et al. | |
| 2014/0186778 A1 | 7/2014 | Colannino et al. | |
| 2014/0196368 A1 | 7/2014 | Wiklof | |
| 2014/0196369 A1 | 7/2014 | Wiklof | |
| 2014/0208758 A1 | 7/2014 | Breidenthal et al. | |
| 2014/0212820 A1 | 7/2014 | Colannino et al. | |
| 2014/0216401 A1 | 8/2014 | Colannino et al. | |
| 2014/0227645 A1 | 8/2014 | Krichtafovitch et al. | |
| 2014/0227646 A1 | 8/2014 | Krichtafovitch et al. | |
| 2014/0227649 A1 | 8/2014 | Krichtafovitch et al. | |
| 2014/0234786 A1 | 8/2014 | Ruiz et al. | |
| 2014/0234789 A1 | 8/2014 | Ruiz et al. | |
| 2014/0248566 A1 | 9/2014 | Krichtafovitch et al. | |
| 2014/0251191 A1 | 9/2014 | Goodson et al. | |
| 2014/0255855 A1 | 9/2014 | Krichtafovitch | |
| 2014/0255856 A1 | 9/2014 | Colannino et al. | |
| 2014/0272731 A1 | 9/2014 | Breidenthal et al. | |
| 2014/0287376 A1 | 9/2014 | Krichtafovitch et al. | |
| 2014/0338350 A1 | 11/2014 | Breidenthal | |
| 2015/0079524 A1 | 3/2015 | Colannino et al. | |
| 2015/0107260 A1 | 4/2015 | Colannino et al. | |
| 2015/0121890 A1 | 5/2015 | Colannino et al. | |
| 2015/0140498 A1 | 5/2015 | Colannino | |
| 2015/0147704 A1 | 5/2015 | Krichtafovitch et al. | |
| 2015/0147705 A1 | 5/2015 | Colannino et al. | |
| 2015/0147706 A1 | 5/2015 | Krichtafovitch et al. | |
| 2015/0219333 A1 | 8/2015 | Colannino et al. | |
| 2015/0241057 A1 | 8/2015 | Krichtafovitch et al. | |
| 2015/0276211 A1 | 10/2015 | Colannino et al. | |

FOREIGN PATENT DOCUMENTS

| | | |
|---|---|---|
| WO | WO 2014/099193 | 6/2014 |
| WO | WO 2014/105990 | 7/2014 |
| WO | WO 2014/127306 | 8/2014 |
| WO | WO 2014/197108 | 12/2014 |

OTHER PUBLICATIONS

PCT International Search Report and Written Opinion of PCT Application No. PCT/US2013/033772 mailed on Jul. 5, 2013.
U.S. Appl. No. 14/061,477, filed Oct. 3, 2013, Krichtafovitch et al.
Altendrfner et al., "Electric Field Effects on Emissions and Flame Stability With Optimized Electric Field Geometry", Third European Combustion Meeting ECM 2007, p. 1-6.
William T. Brande; "The Bakerian Lecture: On Some New Electro-Chemical Phenomena", Phil. Trans. R. Soc. Lond. 1814 104, p. 51-61.
James Lawton and Felix J. Weinberg. "Electrical Aspects of Combustion". Clarendon Press, Oxford. 1969.

FIG. 2
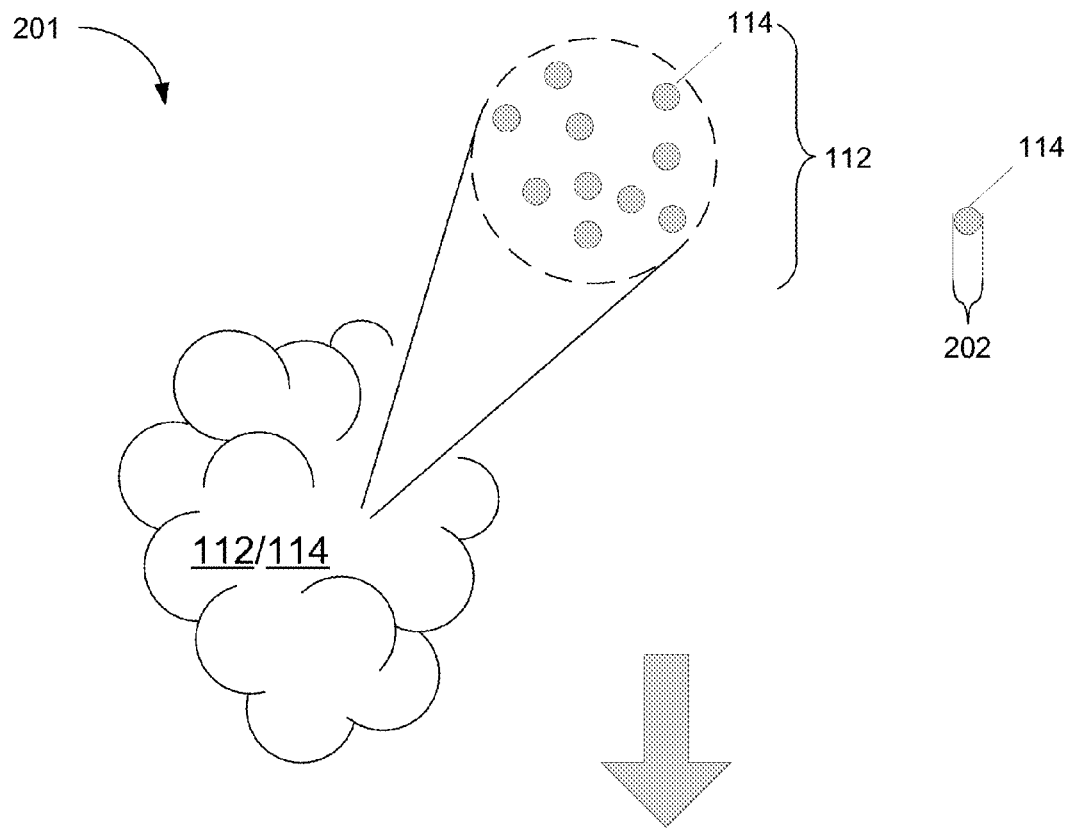
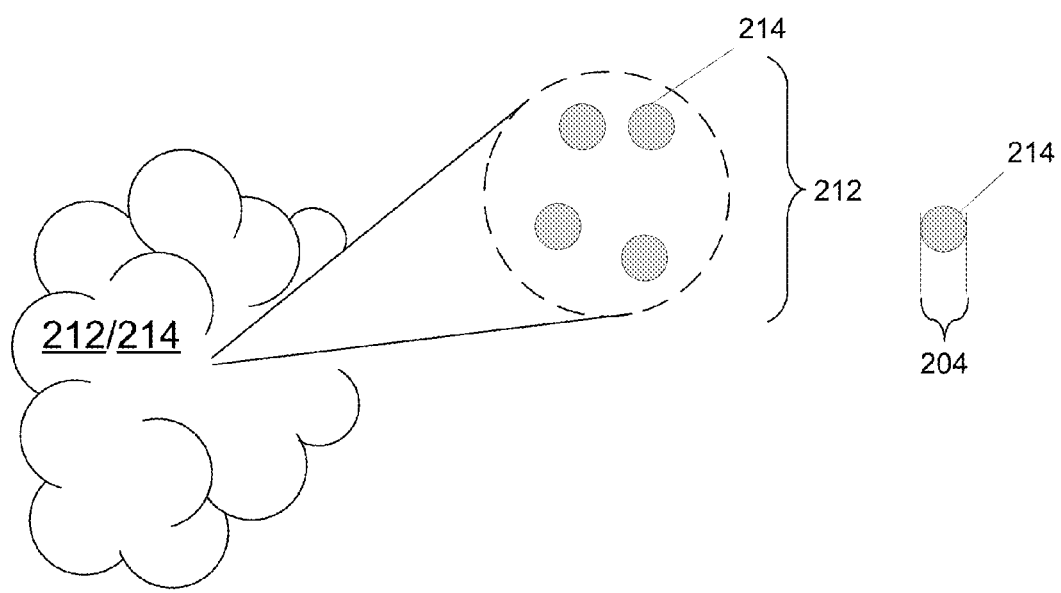

though, for the extent not inconsistent with the disclosure herein, are incorporated by reference.

ELECTRICALLY-DRIVEN PARTICULATE AGGLOMERATION IN A COMBUSTION SYSTEM

CROSS-REFERENCE TO RELATED APPLICATIONS

The present application claims priority benefit from U.S. Provisional Patent Application No. 61/616,223, entitled "MULTIPLE FUEL COMBUSTION SYSTEM AND METHOD", filed Mar. 27, 2012; and U.S. Provisional Patent Application No. 61/694,212, entitled "ELECTRICALLY-DRIVEN PARTICULATE AGGLOMERATION IN A COMBUSTION SYSTEM", filed Aug. 28, 2012; which, to the extent not inconsistent with the disclosure herein, are incorporated by reference.

BACKGROUND

Combustion reactions may produce a variety of combustion products, including particulate products. Government regulations impose limits on the amount of particulate pollution that can be released into the atmosphere. It may therefore be necessary to control the amount of particulates produced in a combustion reaction and/or to remove some portion of the particulates from a combustion exhaust stream before it is released.

SUMMARY

In an embodiment, a system is configured to apply electrical energy to a combustion reaction to produce agglomerated combustion particulates. The system includes at least one electrode, and can include a plurality of electrodes. The electrode is configured to apply electrical energy to a combustion reaction. The system includes a combustion zone. The combustion zone is configured to support the combustion reaction of a fuel at or near a fuel source. The combustion reaction produces a distribution of combustion particulates. The distribution of combustion particulates can be characterized by an average particulate diameter or an average particulate mass. The system also includes an electrical power source. The electrical power source is operatively coupled to the electrode. The electrical power source is configured to apply electrical energy, via the electrode, to the combustion reaction. The electrical energy applied via the electrode to the combustion reaction is controlled to be sufficient to cause an increase in the average particulate diameter or in the average particulate mass of the combustion particulates. The increase in average particulate diameter or average particulate mass of the combustion particulates produces a modified distribution of agglomerated combustion particulates.

According to an embodiment, the system includes first and second electrodes, and is configured to form an electrical circuit through the combustion reaction.

According to an embodiment, a method of agglomerating particulates in a combustion reaction is provided. The method includes contacting a fuel and an oxidant in a combustion zone to support a combustion reaction, which produces a distribution of combustion particulates. The method also includes applying electrical energy to the combustion reaction sufficient to cause agglomeration of the combustion particulates.

BRIEF DESCRIPTION OF THE DRAWINGS

FIG. 2 is a conceptual scheme illustrating a distribution of combustion particulates characterized by an average particulate diameter and a modified distribution of agglomerated combustion particulates characterized by a modified average particulate diameter, according to an embodiment.

DETAILED DESCRIPTION

Figure 1:
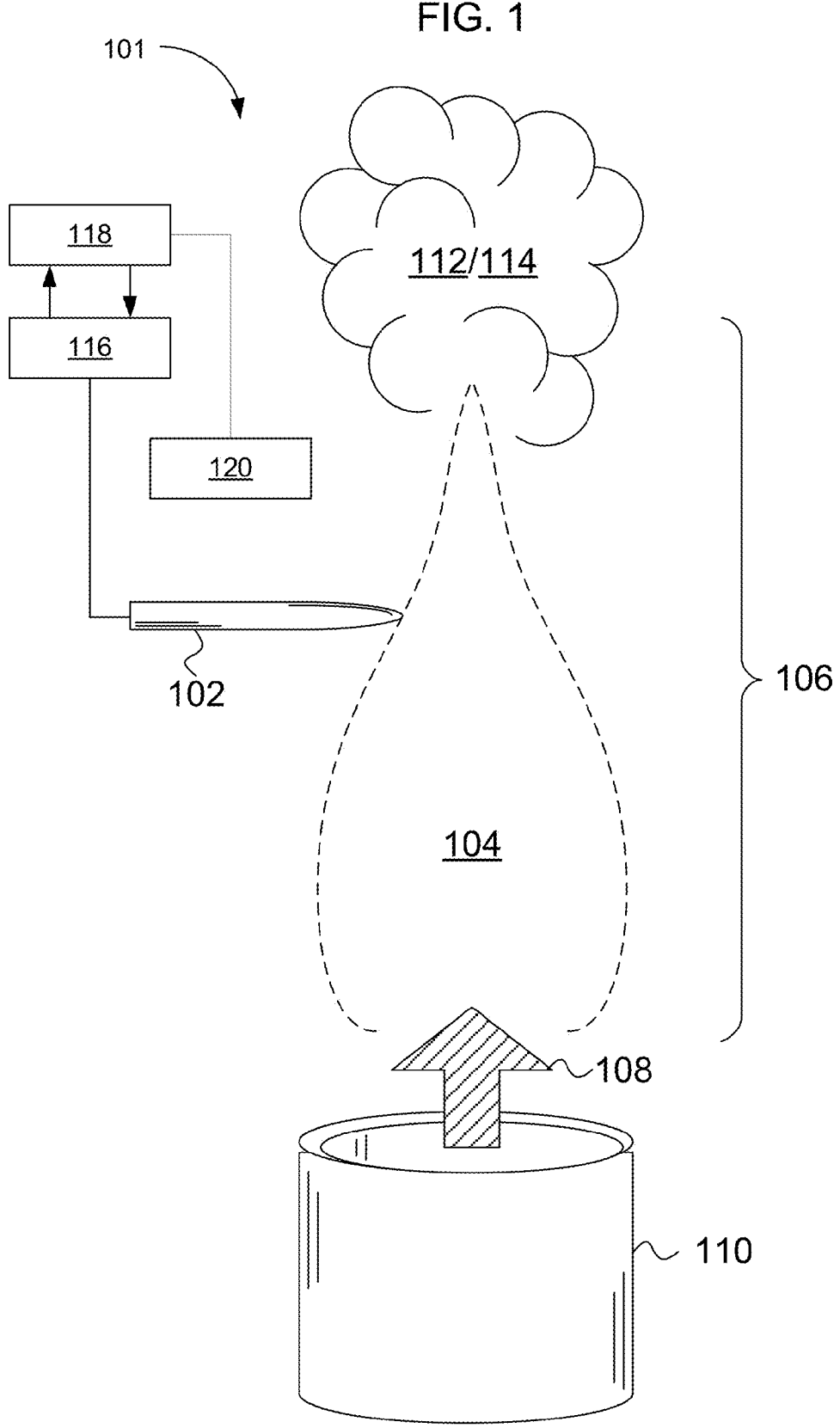
FIG. 1 is a block diagram of a system configured to apply electrical energy to a combustion reaction to produce agglomerated combustion particulates, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

The inventor has recognized that removing particulates from a combustion exhaust stream can be difficult. Many are of such small size that collecting the particles by filtering or other particulate collection methods is undesirably difficult, expensive, inefficient, etc. According to various embodiments, systems and methods are provided in which the combustion particulates produced in combustion reactions are made to agglomerate into larger clusters, i.e., agglomerated particulates. According to some embodiments, the larger agglomerated particulates can be removed from an exhaust stream more easily and with less expense than typical combustion particulates. According to other embodiments, the agglomerated particulates can be removed from an exhaust stream with lower pressure drop (e.g., expressed as reduced back pressure), with higher removal efficiency, and/or with reduced loss of thermodynamic efficiency. Furthermore, because they are larger and more massive, agglomerated particulates that may remain in the exhaust stream fall out of the atmosphere more quickly, and thus have a lower impact on air quality.

In tests, it was found that combustion particles can be made to agglomerate when the combustion reaction is energized by an electrical source. In particular, the inventor found that a number of different types of signals can be applied to promote agglomeration. With regard to DC-type signals, a positive-polarity signal applied to the combustion reaction can be more effective than a negative polarity signal. Regarding periodic signals, a signal that that alternates polarity can be used, as can a signal that does not change polarity, i.e., a signal with a DC offset. In general, frequencies of between about 50 Hz and 1000 Hz are effective, with the strongest agglomeration being achieved at frequencies between about 200 Hz and 300 Hz. Results are also stronger at higher signal voltage levels. On the other hand, current levels, and thus power consumption, are very low. Typically, the signal voltage should be above 1000 V, and can exceed 40,000 V.

These values can vary according to various factors, such as, for example, the type, size, and temperature of the combustion reaction, the configuration of the space in which the combustion occurs, the formulations of the fuel and oxidizer, the ambient temperature, humidity, etc.

It is theorized that the agglomeration is caused by an increase in effective particle diameter responsive to the acceleration of charged particles in the electric field. Collisions between charged and uncharged particles can accelerate the uncharged particles. The increase in effective diameter increases the likelihood that it will come into contact with other such particulates. As particulates of appropriate types contact each other, they tend to adhere, forming agglomerated particles.

FIG. 1 is a block diagram of a system 101 configured to apply electrical energy to a combustion reaction 104 to produce agglomerated combustion particulates, according to an embodiment. The system 101 includes one or more electrodes 102. The one or more electrodes 102 are configured to apply electrical energy to a combustion reaction 104, for example, by direct contact. The system 101 also includes a combustion zone 106. The combustion zone 106 is configured to support the combustion reaction 104 of a fuel 108 supplied by a fuel source 110. The combustion reaction 104 is capable of producing a distribution 112 of combustion particulates 114. The distribution 112 of the combustion particulates 114 can be characterized by at least one of an average particulate diameter 202 (see FIG. 2) or an average particulate mass. The system 101 also includes an electrical power source 116. The electrical power source 116 is operatively coupled to the one or more electrodes 102. The electrical power source 116 is configured to apply electrical energy via the one or more electrodes 102 to the combustion reaction 104. The electrical energy applied via the one or more electrodes 102 to the combustion reaction 104 is sufficient to cause an increase in at least one of the average particulate diameter 202 or the average particulate mass of the distribution 112 of the combustion particulates 114. The increase in at least one of the average particulate diameter 202 or the average particulate mass of the distribution 112 of the combustion particulates 114 produces a modified distribution 212 of agglomerated combustion particulates 214 (see FIG. 2).

FIG. 2 is a conceptual scheme 201 illustrating the distribution 112 of the combustion particulates 114 and the average particulate diameter 202. FIG. 2 also illustrates the modified distribution 212 of the agglomerated combustion particulates 214 and the modified average particulate diameter 204.

Referring again to FIG. 1, in an embodiment, the system 101 also includes the fuel source 110. The fuel source 110 is configured to deliver the fuel 108 in the form of one or more of a gas, a liquid, a solid, or a powdered solid. Additionally or alternatively, the combustion reaction 104 can include a flame. Additionally or alternatively, the combustion reaction 108 can at least intermittently produce the distribution 112 of the combustion particulates 114. Additionally or alternatively, the distribution 112 of the combustion particulates 114 can be visible or invisible to the human eye.

In an embodiment, the electrical power source 116 is configured to apply the electrical energy via the one or more electrodes 102 to the combustion reaction 104 sufficient to cause an increase of at least about 50% in the average particulate diameter 202 of the distribution 112 of the combustion particulates 114. The increase of at least about 50% in the average particulate diameter 202 of the distribution 112 of the combustion particulates 114 produces the modified average particulate diameter 204 of the modified distribution 212 of the agglomerated combustion particulates 214. Additionally or alternatively, the average particulate diameter 202 of the distribution 112 of the combustion particulates 114 can also be increased such that the modified average particulate diameter 204 is in a range between about 1 micrometer and about 1 millimeter.

In an embodiment, the electrical power source 116 is configured to apply the electrical energy via the one or more electrodes 102 to the combustion reaction 104 sufficient to cause an increase of at least about 50% in the average particulate mass of the distribution 112 of the combustion particulates 114. The increase of at least about 50% in the average particulate mass of the distribution 112 of the combustion particulates 114 produces the modified average particulate mass of the modified distribution 212 of the agglomerated combustion particulates 214. Additionally or alternatively, the average particulate mass of the distribution 112 of the combustion particulates 114 can be increased such that the modified average particulate mass is in a range between about 0.1 microgram and about 1 milligram.

In an embodiment, the system 101 includes a controller 118. The controller 118 is operatively coupled to the electrical power source 116. The controller 118 is configured via machine executable instructions. The machine executable instructions can cause the controller 118 to automatically control the electrical power source 116. The electrical power source 116 is automatically controlled to apply the electrical energy via the one or more electrodes 102 to the combustion reaction 104. The electrical energy is sufficient to cause the increase in at least one of the average particulate diameter 202 or the average particulate mass of the distribution 112 of the combustion particulates 114 to produce the modified distribution 212 of the agglomerated combustion particulates 214.

In an embodiment, the system 101 may include at least one sensor 120. The at least one sensor is operatively coupled to the controller 118. The controller 118 is configured to detect a sensor value from the at least one sensor 120, for example, configured at least in part according to the machine executable instructions. Additionally or alternatively, the controller 118 can automatically control the electrical power source 116 to apply the electrical energy via the one or more electrodes 102 to the combustion reaction 104 at least in part responsive to the sensor value from the at least one sensor 120.

In various embodiments, the controller 118 and the at least one sensor 120 are configured to detect the sensor value corresponding to one or more of the following values. The sensor value may correspond to a fuel flow rate. The sensor value may correspond to a temperature. The sensor value may correspond to an oxygen level. The sensor value may correspond to a voltage. The sensor value may correspond to a charge. The sensor value may correspond to a capacitance. The sensor value may correspond to a current. The sensor value may correspond to a time-varying electrical signal. The sensor value may correspond to a frequency of a periodic electrical signal. The sensor value may correspond to an observed value that correlates to the average particulate diameter. The sensor value may correspond to an observed value that correlates to the average particulate mass. The sensor value may correspond to an observed value that correlates to a density of the distribution of particulates. The sensor value may correspond to an electromagnetic scattering value, for example, a scattering of infrared, visible, or ultraviolet light. The sensor value may correspond to an electromagnetic absorption value, for example, an absorption of infrared, visible, or ultraviolet light. The sensor value may correspond to an electromagnetic emission value, for example, an emission of infrared, visible, or ultraviolet light.

In an embodiment, the electrical power source 116 is configured to apply the electrical energy to the combustion reaction 104 by delivering a charge, a voltage, or an electric field through the one or more electrodes 102. For example, the electrical power source 116 is configured to apply the electrical energy to the combustion reaction 104 as a static electrical signal through the one or more electrodes 102. The electrical power source 116 is configured to apply the electrical energy to the one or more electrodes 102 in a voltage range between about +50,000 kilovolts and about −50,000 kilovolts. Additionally or alternatively, the electrical power source 116 is configured to apply the electrical energy to the combustion reaction 104 as a time-varying electrical signal through the one or more electrodes 102. The time-varying electrical signal may include a periodic component. For example, the time-varying electrical signal may include a periodic component characterized by one or more frequencies in a range between about 1 Hertz and about 10,000 Hertz. Additionally or alternatively, the time-varying electrical signal can include an alternating current.

In an embodiment, the system 101 includes a plurality of electrodes 102 operatively coupled to the electrical power source 116. The electrical power source 116 is configured to drive the plurality of electrodes 102 in a manner similar to that described above with reference to FIG. 1. Another example of a system that employs a plurality of electrodes is described in more detail below, with reference to FIG. 4.

Figure 3:
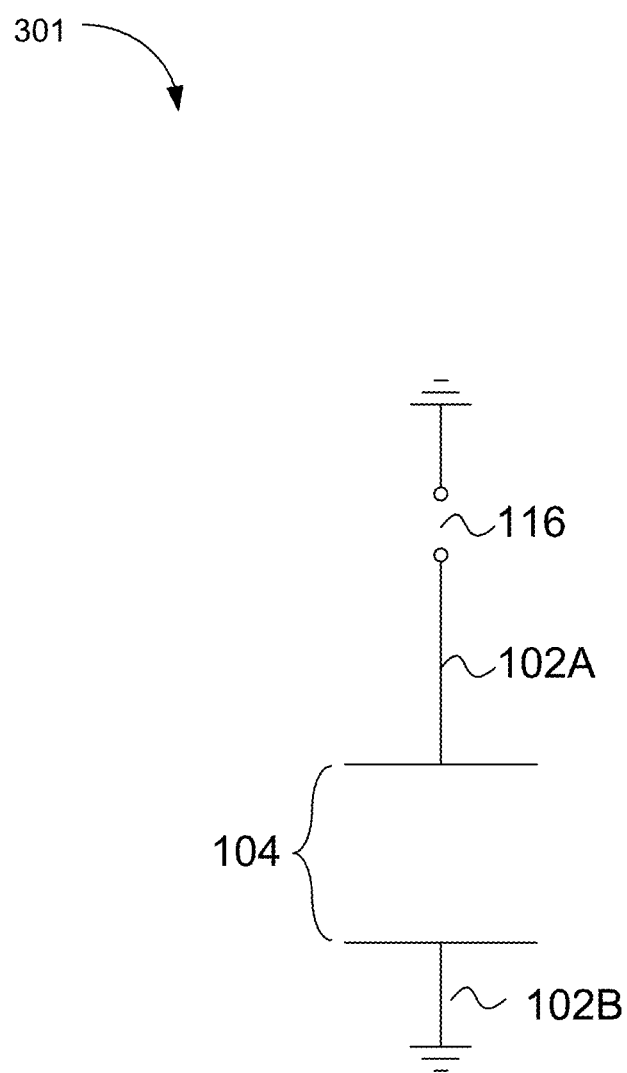
FIG. 3 is a conceptual schematic of a circuit, including a first electrode, a second electrode, an electrical power supply, and the combustion reaction, according to an embodiment.

FIG. 3 is a conceptual schematic of a circuit 301. In an embodiment, the circuit 301 is configured from, for example, the first electrode 102A, the second electrode 102B, the electrical power supply 116, and the combustion reaction 104. The electrical power source 116 is configured to electrically drive the circuit 301. The combustion reaction 104 functions in the circuit 301 at least intermittently as one or more of a resistor, a capacitor, or an inductor.

Figure 4:
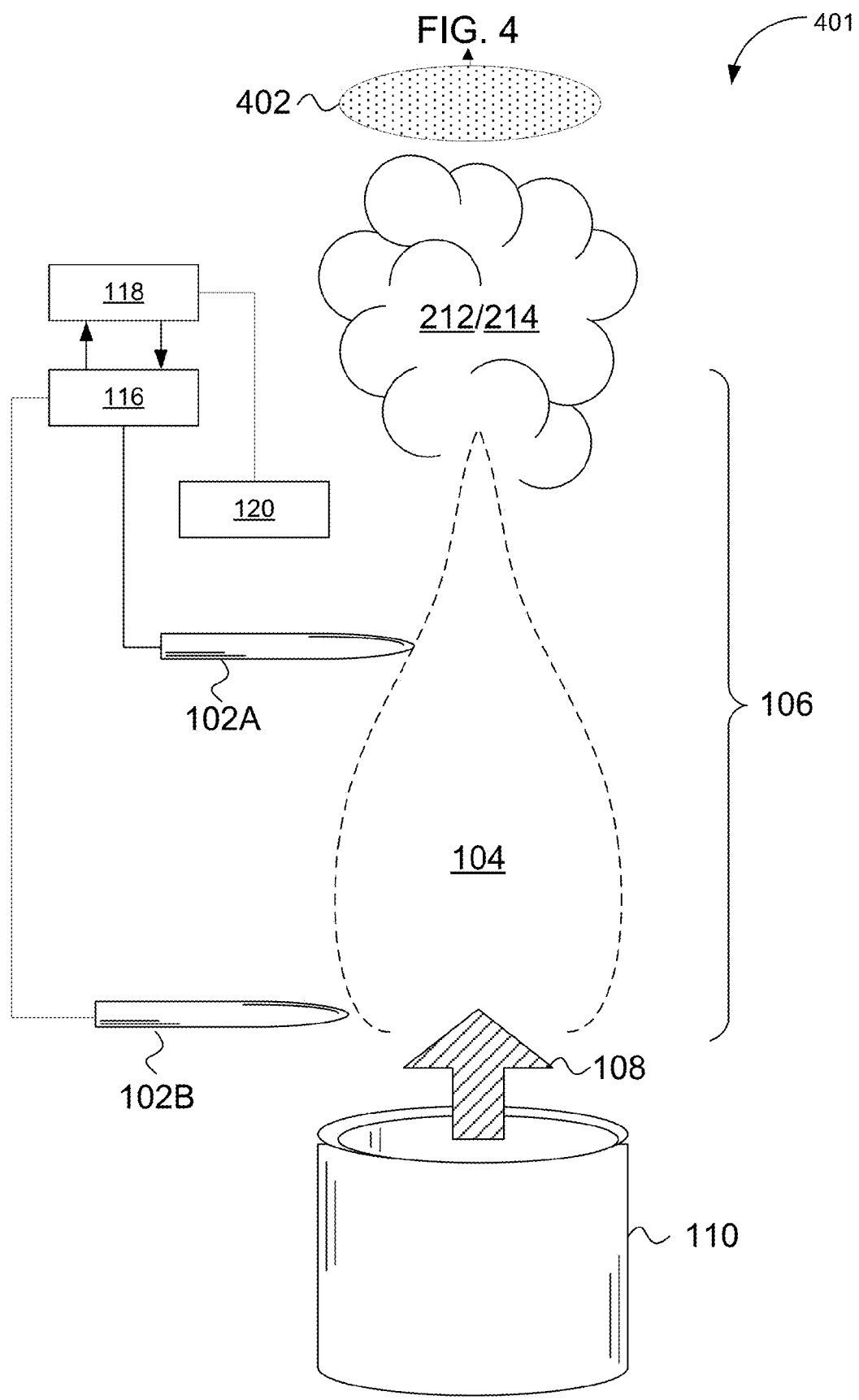
FIG. 4 is a block diagram of a system configured to apply electrical energy to a combustion reaction to produce agglomerated combustion particulates, further including a particulate separation device, according to an embodiment.

FIG. 4 is a block diagram of a system 401. In an embodiment, the system 401 is configured to apply electrical energy to the combustion reaction 104 to produce the agglomerated combustion particulates.

The system 401 includes a first electrode 102A and a second electrode 102B. The electrical power source 116 is configured to drive the first electrode 102A and the second electrode 102B. In the example shown, the electrical power source 116 is configured to drive the first and second electrodes 102A and 102B, with a time-varying electrical signal in a range between about 1 Hertz and about 1200 Hertz. The electrical power source 116 is configured to drive the first and second electrodes 102A and 102B, with the voltage in a range between about +15,000 volts and about −15,000 volts.

The system 401 is configured to form a closed electrical circuit. During operation, the electrical power source 116 drives the circuit, producing an electrical current that passes through the first electrode 102A, the combustion reaction 104, and the second electrode 102B. In some embodiments, the circuit may be intermittent, as action of a flame, for example, opens and closes the circuit.

The electrical power source 116 and controller 118 can be configured to automatically control parameters of the energy applied to the combustion process to obtain a desired result. For example, where agglomeration of the combustion particulates 214 to produce a smaller number of relatively large particulates is desired, the electrical power source 116 and controller 118 can be configured to control signal frequency and voltage to cause agglomeration of the particulates 214, using feedback from the sensor 120 to determine the optimum values.

The system 401 may include a particulate separation device 402. The particulate separation device 402 is configured to collect a portion of the modified distribution 212 of the agglomerated combustion particulates 214. Additionally or alternatively, the particulate separation device 402 is configured to collect a portion of the distribution 112 of the combustion particulates 114. Additionally or alternatively, the particulate separation device 402 is configured to collect the modified distribution 212 of the agglomerated combustion particulates 214 preferentially or selectively compared to the distribution 112 of the combustion particulates 114. For example, the portion of the modified distribution 212 of the agglomerated combustion particulates 214 is collected by the particulate separation device 402 according to the increase in the average particulate diameter 202 or the average particulate mass of the distribution 112 of the combustion particulates 114. The portion of the modified distribution 212 of the agglomerated combustion particulates 214 is collected by the particulate separation device 402 according to the modified average particulate diameter 204 or the modified average particulate mass of the modified distribution 212 of the agglomerated combustion particulates 214. The particulate separation device 402 includes one or more of: a filter, a baghouse, a cyclone separator, a baffle separator, a wet scrubber, or an electrostatic precipitator.

Figure 5:
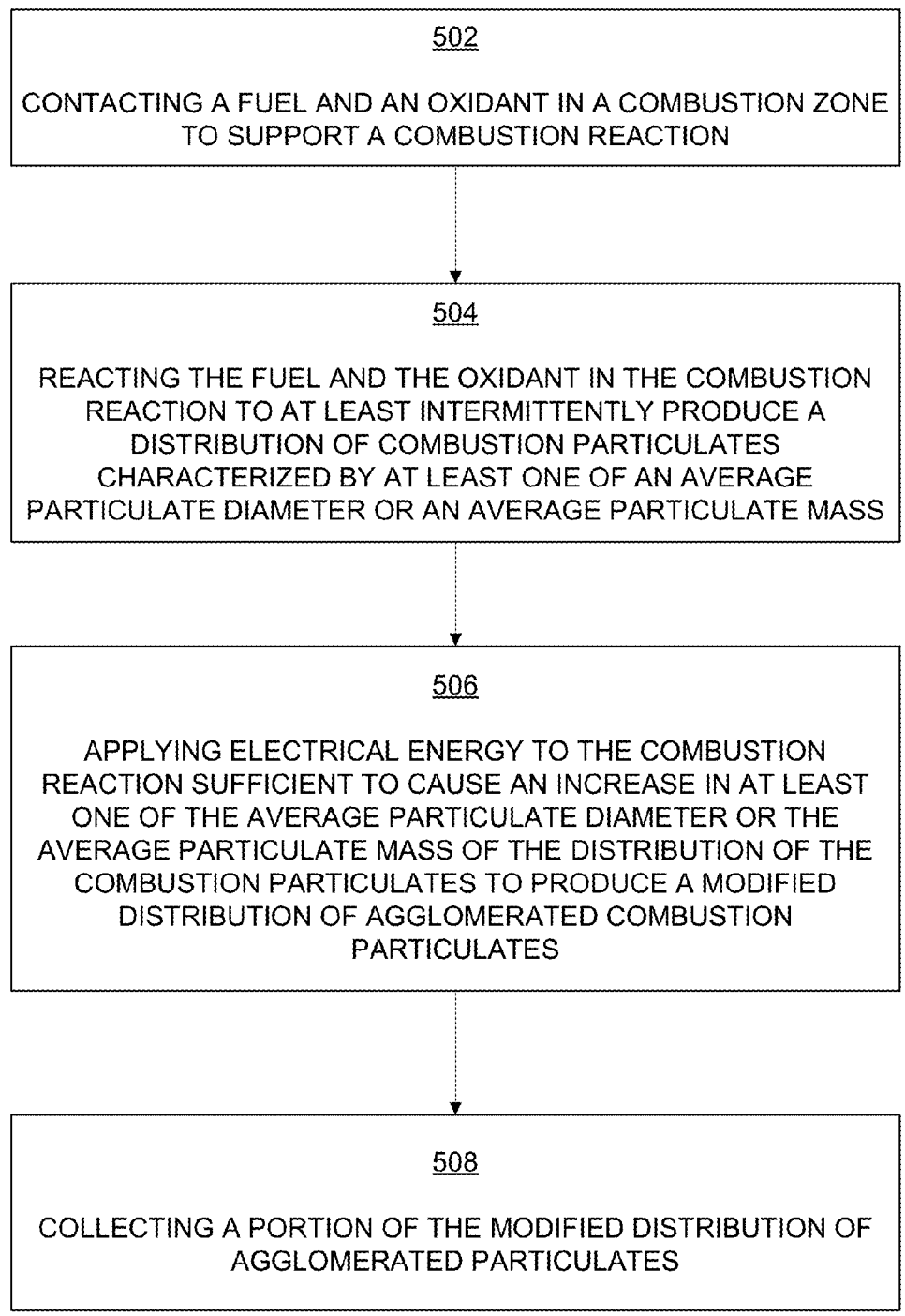
FIG. 5 is a flow diagram of a method of agglomerating particulates in a combustion reaction, according to an embodiment.

FIG. 5 is a flow diagram of a method 501 of agglomerating particulates in a combustion reaction. In an embodiment, the method 501 includes an operation 502 of contacting a fuel and an oxidant in a combustion zone to support a combustion reaction. The method 501 also includes an operation 504 of reacting the fuel and the oxidant in the combustion reaction to at least intermittently produce a distribution of combustion particulates. The distribution of combustion particulates is characterized by at least one of an average particulate diameter or an average particulate mass. The method 501 also includes an operation 506 of applying electrical energy to the combustion reaction sufficient to cause an increase in at least one of the average particulate diameter or the average particulate mass of the distribution of the combustion particulates to produce a modified distribution of agglomerated combustion particulates. The operation 506 of applying the electrical energy is conducted by an electrical power supply. The electrical power supply is configured to apply the electrical energy via one or more electrodes. The one or more electrodes are configured to apply the electrical energy from the electrical power supply to the combustion reaction.

In an embodiment, the method 501 includes providing the fuel in the form of one or more of a gas, a liquid, a solid, or a powdered solid. Additionally or alternatively, the method 501 includes contacting the fuel and the oxidant in the combustion zone to support a flame. Additionally or alternatively, in the method 501, the distribution of the combustion particulates is visible or invisible to the human eye.

In an embodiment, the method 501 includes applying the electrical energy to the combustion reaction sufficient to cause an increase of at least about 50% in the average particulate diameter of the distribution of the combustion particulates. The increase of at least about 50% in the average particulate diameter produces a modified average particulate diameter of the modified distribution of the agglomerated combustion particulates. The method 501 also includes increasing the average particulate diameter of the distribution of the combustion particulates such that the modified average particulate diameter is in a range between about 1 micrometer and about 1 millimeter.

In an embodiment, the method 501 includes applying the electrical energy to the combustion reaction sufficient to cause an increase of at least about 50% in the average particulate mass of the distribution of the combustion particulates. The increase of at least about 50% in the average particulate mass produces a modified average particulate mass of the modified distribution of the agglomerated combustion particulates. The method 501 also includes increasing the average particulate mass of the distribution of the combustion particulates such that the modified average particulate mass is in a range between about 0.1 microgram and about 1 milligram.

In an embodiment, the method 501 includes automatically applying the electrical energy to the combustion reaction sufficient to cause the increase in at least one of the average particulate diameter or the average particulate mass of the distribution of the combustion particulates to produce the modified distribution of the agglomerated combustion particulates. Automatically applying the energy is accomplished by an automated controller configured by one or more machine executable instructions. The machine executable instructions are typically carried by a non-transitory computer-readable medium. The controller can control the electrical power supply to apply the electrical energy according to the machine executable instructions. The machine executable instructions are configured to carry out one or more operations, actions, or steps described herein.

In an embodiment, the method 501 includes detecting a sensor value associated with the combustion reaction. Additionally or alternatively, the method 501 also includes automatically applying the electrical energy to the combustion reaction at least in part responsive to the sensor value. The machine executable instructions are configured for operating the controller to automatically detect the sensor value associated with the combustion reaction.

In various embodiments, the sensor value corresponds to one or more of the following values. The sensor value may correspond to a fuel flow rate. The sensor value may correspond to a temperature. The sensor value may correspond to an oxygen level. The sensor value may correspond to a voltage. The sensor value may correspond to a charge. The sensor value may correspond to a capacitance. The sensor value may correspond to a current. The sensor value may correspond to a time-varying electrical signal. The sensor value may correspond to a frequency of a periodic electrical signal. The sensor value may correspond to an observed value that correlates to the average particulate diameter. The sensor value may correspond to an observed value that correlates to the average particulate mass. The sensor value may correspond to an observed value that correlates to a density of the distribution of particulates. The sensor value may correspond to an electromagnetic scattering value, for example, a scattering of infrared, visible, or ultraviolet light. The sensor value may correspond to an electromagnetic absorption value, for example, an absorption of infrared, visible, or ultraviolet light. The sensor value may correspond to an electromagnetic emission value, for example, an emission of infrared, visible, or ultraviolet light.

In an embodiment, the method 501 includes applying the electrical energy by delivering a charge, a voltage, or an electric field to the combustion reaction. The method 501 includes applying the electrical energy to the combustion reaction as a static electrical signal. For example, the method 501 may include applying the electrical energy to the combustion reaction in a voltage range between about +50,000 kilovolts and about −50,000 kilovolts. The method 501 may include applying the electrical energy to the combustion reaction in a voltage range between about +15,000 kilovolts and about −15,000 kilovolts. In an embodiment, the method 501 includes applying the electrical energy to the combustion reaction as a time-varying electrical signal. The time-varying electrical signal may include, for example, an alternating current. The time varying electrical signal may include a periodic component. For example, the time-varying electrical signal may include a periodic component characterized by one or more frequencies in a range between about 1 Hertz and about 10,000 Hertz. In some embodiments, the time-varying electrical signal includes a periodic component characterized by one or more frequencies in a range between about 1 Hertz and about 1200 Hertz.

In an embodiment, the method 501 includes applying the electrical energy to form a circuit with the combustion reaction. The electrical energy is applied to electrically drive the circuit. The electrical energy may electrically drive the circuit such that the combustion reaction functions in the circuit at least intermittently as one or more of a resistor, a capacitor, or an inductor. The circuit may further include, for example, the one or more electrodes, e.g., a first electrode and a second electrode; and the electrical power supply, operatively coupled to the one or more electrodes; all configured together with the combustion reaction to at least intermittently form the circuit.

In an embodiment, the method 501 includes an operation 508 of collecting a portion of the modified distribution of the agglomerated combustion particulates, for example, by particulate separation. The operation of collecting the portion of the modified distribution of the agglomerated combustion particulates can proceed according at least in part to the increase in the average particulate diameter or the average particulate mass. Additionally or alternatively, the method 501 includes collecting a portion of the distribution of the combustion particulates. Additionally or alternatively, the operation 508 of collecting the portion of the modified distribution of the agglomerated combustion particulates can proceed preferentially or selectively compared to collecting the portion of the distribution of the combustion particulates. For example, the portion of the modified distribution of the agglomerated combustion particulates is collected by particulate separation according to the increase in the average particulate diameter or the average particulate mass of the distribution of the combustion particulates. Additionally or alternatively, collecting the portion of the modified distribution of the agglomerated combustion particulates is collected by particulate separation according to the modified average particulate diameter or the modified average particulate mass of the modified distribution of the agglomerated combustion particulates. In an embodiment, the method 501 includes collecting the portion of the modified distribution of the agglomerated combustion particulates by one or more of: filtering, baghouse collecting, cyclonic separating, baffle inertial separating, wet scrubbing, or electrostatic precipitating.

Figure 6:
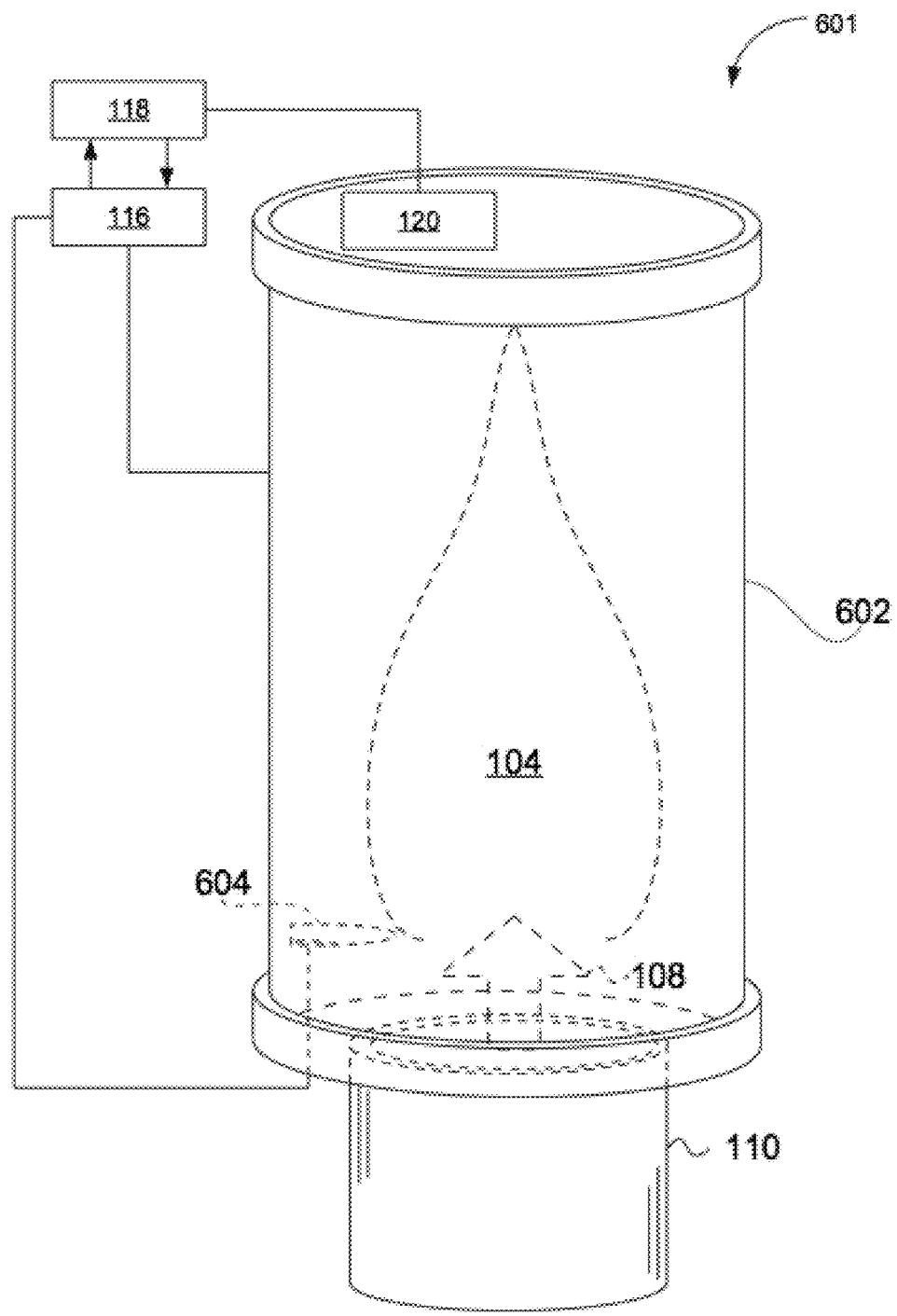
FIG. 6 is a block diagram of a system configured to apply electrical energy to a combustion reaction to produce agglomerated combustion particulates, further including a housing, according to an embodiment.

FIG. 6 is a block diagram of a system 601. The system 601 includes a cylindrical housing 602 that defines lateral dimensions of a combustion zone, within which the combustion reaction occurs. According to an embodiment, at least a portion of the housing 602 is conductive, and functions as a first electrode. A second electrode 604 is positioned inside the housing 602, and is electrically isolated from the housing. The electrical power source 116 is coupled to the housing 602 and second electrode 604, and is configured to apply electrical energy to the combustion reaction 104 substantially as described above, in particular, with reference to the embodiment of FIG. 4.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A system, comprising:
a combustion zone configured to be operatively coupled to a fuel source and to support a flame supported by a fuel from the fuel source;
a first electrode and a second electrode, each configured to apply electrical energy to the flame;
an electrical power source that is:
operatively coupled to the first electrode and to the second electrode, and
configured to drive an electrical circuit formed by the first electrode, the flame, and the second electrode and to apply electrical energy to the flame sufficient to cause agglomeration of combustion particulates produced by the flame, and to form thereby agglomerated combustion particulates; and
a controller and a sensor operatively coupled to the controller,
the controller being operatively coupled to the electrical power source,
the controller being configured to receive a sensor value from the sensor and automatically control the electrical power source to apply the electrical energy at least in part responsive to the sensor value;
wherein at least one of the first electrode and the second electrode is in at least intermittent electrical contact with the flame to form an electrical current circuit; and
wherein the sensor is configured to produce the sensor value corresponding to one or more of: an average particulate diameter of the agglomerated combustion particulates; an average particulate mass of the agglomerated combustion particulates; a density of distribution of the agglomerated combustion particulates; an electromagnetic scattering value; an electromagnetic absorption value; or an electromagnetic emission value.

2. The system of claim 1, wherein the second electrode includes a housing defining lateral boundaries of the combustion zone.

3. The system of claim 1, wherein the electrical power source is configured to apply electrical energy to the flame sufficient to produce agglomerated combustion particulates having an increased average particulate mass, as compared to an average particulate mass of combustion particulates produced by the flame in the absence of the electrical energy.

4. The system of claim 1, wherein the electrical power source is configured to apply electrical energy to the flame sufficient to produce agglomerated combustion particulates having an average particulate diameter at least about 50% greater than an average particulate diameter of combustion particulates produced by the flame in the absence of the electrical energy.

5. The system of claim 1, wherein the electrical power source is configured to apply electrical energy to the flame sufficient to produce agglomerated combustion particulates having an average particulate diameter in a range between about 1 micrometer and about 1 millimeter.

6. The system of claim 1, wherein the electrical power source is configured to apply electrical energy to the flame sufficient to produce agglomerated combustion particulates having an average particulate mass at least about 50% greater than an average particulate mass of combustion particulates produced by the flame in the absence of the electrical energy.

7. The system of claim 1, wherein the electrical power source is configured to apply electrical energy to the flame sufficient to produce agglomerated combustion particulates having an average particulate mass in a range of between about 0.1 microgram and about 1 milligram.

8. The system of claim 1, wherein the controller is configured to automatically control the electrical power source via machine executable instructions.

9. The system of claim 1, wherein the sensor is configured to produce the sensor value corresponding to one or more of: a fuel flow rate; a temperature; an oxygen level; a voltage; a charge; a capacitance; and a current.

10. The system of claim 1, wherein the electrical power source is configured to apply the electrical energy to the flame by delivering any of a charge, a voltage, or an electric field.

11. The system of claim 1, wherein the electrical power source is configured to apply the electrical energy to the flame as a static electrical signal.

12. The system of claim 10, wherein the electrical power source is configured to apply the electrical energy to the flame in a voltage range between about +50,000 kilovolts and about −50,000 kilovolts.

13. The system of claim 1, wherein the electrical power source is configured to apply electrical energy to the flame as a time-varying electrical signal.

14. The system of claim 13, wherein the time-varying electrical signal includes a periodic component.

15. The system of claim 13, wherein the time-varying electrical signal includes a periodic component having a frequency in a range between about 1 Hertz and about 10,000 Hertz.

16. The system of claim 13, wherein the time-varying electrical signal includes a periodic component having a frequency in a range of between about 50 Hertz and about 1000 Hertz.

17. The system of claim 13, wherein the time-varying electrical signal includes a periodic component having a frequency in a range of between about 200 Hertz and about 300 Hertz.

18. The system of claim 13, wherein the time-varying electrical signal includes an alternating current component.

19. The system of claim 1, wherein the electrical power source is configured to apply electrical energy to the flame via the first electrode and the second electrode with a time-varying electrical signal in a range between about 1 Hertz and about 1200 Hertz.

20. The system of claim 1, wherein the electrical power source is configured to apply electrical energy to the flame via the first electrode and the second electrode with a voltage in a range between about +15,000 volts and about −15,000 volts.

21. The system of claim 1, wherein the first electrode, the second electrode, the electrical power source, and the flame together form a circuit;
wherein the electrical power source is configured to electrically drive the circuit; and
wherein the flame functions in the circuit at least intermittently as one or more of a resistor, a capacitor, or an inductor.

22. The system of claim 1, further comprising a particulate separation device configured to collect a portion of the agglomerated combustion particulates.

23. The system of claim 22, wherein the particulate separation device includes one or more of: a filter, a baghouse, a cyclone separator, a baffle separator, a wet scrubber, or an electrostatic precipitator.

24. The system of claim 1, further comprising direct contact of the first electrode and/or the second electrode and the flame.

25. A method, comprising:
supporting a flame by contacting a fuel and an oxidant in a combustion zone;

producing combustion particulates by reacting the fuel and the oxidant in the flame; and producing agglomerated combustion particulates by applying electrical energy to the flame sufficient to cause agglomeration of the combustion particulates produced by the flame;

forming an electrical current circuit by putting a first electrode and a second electrode into at least intermittent electrical contact with the flame;

sensing a sensor value corresponding to one or more of: an average particulate diameter of the agglomerated combustion particulates; an average particulate mass of the agglomerated combustion particulates; a density of distribution of the agglomerated combustion particulates; an electromagnetic scattering value; an electromagnetic absorption value; or an electromagnetic emission value; and inputting the sensor value to a controller that automatically controls the electrical current at least in part responsive to the sensor value;

wherein at least one of the first electrode and the second electrode is in at least intermittent electrical contact with the flame to form the electrical current circuit.

26. The method of claim 25, wherein the step of applying electrical energy to the flame includes applying electrical energy to the flame sufficient to cause an increase of at least about 50% in an average particulate diameter of the agglomerated combustion particulates as compared to an average particulate diameter of the combustion particulates produced by the flame.

27. The method of claim 26, wherein the step of producing agglomerated combustion particulates includes producing agglomerated combustion particulates having an average particulate diameter in a range between about 1 micrometer and about 1 millimeter.

28. The method of claim 25, wherein the step of applying electrical energy to the flame includes applying electrical energy to the flame sufficient to cause an increase of at least about 50% in an average particulate mass of the agglomerated combustion particulates as compared to an average particulate mass of the combustion particulates produced by the flame.

29. The method of claim 28, wherein the step of producing agglomerated combustion particulates includes producing agglomerated combustion particulates having an average particulate mass in a range between about 0.1 microgram and about 1 milligram.

30. The method of claim 25, wherein the step of applying electrical energy to the flame includes automatically applying the electrical energy to the flame sufficient to cause agglomeration of the combustion particulates produced by the flame.

31. The method of claim 30, wherein the step of automatically applying the electrical energy to the flame includes automatically applying the electrical energy to the flame at least in part responsive to the sensor value.

32. The method of claim 31, wherein the step of sensing a sensor value includes detecting a sensor value corresponding to one or more of: a fuel flow rate; a temperature; an oxygen level; a voltage; a charge; a capacitance; and a current.

33. The method of claim 25, wherein the step of applying electrical energy to the flame includes applying electrical energy by delivering at least one of a charge, a voltage, or an electric field to the flame.

34. The method of claim 25, wherein the step of applying electrical energy to the flame includes applying electrical energy to the flame as a substantially constant electrical signal.

35. The method of claim 25, wherein the step of applying electrical energy to the flame includes applying electrical energy to the flame in a voltage range between about +50,000 kilovolts and about −50,000 kilovolts.

36. The method of claim 35, wherein the step of applying electrical energy to the flame includes applying electrical energy to the flame in a voltage range between about +15,000 kilovolts and about −15,000 kilovolts.

37. The method of claim 33, wherein the step of applying electrical energy to the flame includes applying electrical energy to the flame as a time-varying electrical signal.

38. The method of claim 37, wherein the step of applying electrical energy to the flame as a time-varying electrical signal includes applying electrical energy to the flame as an alternating current.

39. The method of claim 37, wherein the step of applying electrical energy to the flame as a time-varying electrical signal includes applying electrical energy to the flame as a time-varying electrical signal having a periodic component.

40. The method of claim 37, wherein the step of applying electrical energy to the flame as a time-varying electrical signal includes applying electrical energy to the flame as a time-varying electrical signal having a periodic component with a frequency in a range between about 1 Hertz and about 10,000 Hertz.

41. The method of claim 37, wherein the step of applying electrical energy to the flame as a time-varying electrical signal includes applying electrical energy to the flame as a time-varying electrical signal having a periodic component with a frequency in a range between about 1 Hertz and about 1200 Hertz.

42. The method of claim 25, wherein the step of applying electrical energy to the flame includes forming an electrical circuit with the flame and applying electrical energy to the circuit.

43. The method of claim 42, wherein the step of applying electrical energy to the circuit includes applying electrical energy to the circuit such that the flame functions in the circuit at least intermittently as one or more of a resistor, a capacitor, or an inductor.

44. The method of claim 25, further comprising collecting a portion of the agglomerated combustion particulates.

45. The method of claim 44, wherein the step of collecting a portion of the agglomerated combustion particulates includes collecting the portion of the agglomerated combustion particulates by at least one of: filtering, baghouse collecting, cyclonic separating, baffle inertial separating, wet scrubbing, or electrostatic precipitating.

46. The method of claim 25, further comprising putting the first electrode and/or the second electrode into direct contact with the flame.

* * * * *